(12) United States Patent
Shearer et al.

(10) Patent No.: US 9,005,330 B2
(45) Date of Patent: Apr. 14, 2015

(54) ELECTRICALLY CONDUCTIVE COMPOSITIONS COMPRISING NON-EUTECTIC SOLDER ALLOYS

(71) Applicant: Ormet Circuits, Inc., San Diego, CA (US)

(72) Inventors: Catherine Shearer, San Marcos, CA (US); Peter A Matturri, Del Mar, CA (US); Kenneth C Holcomb, San Diego, CA (US); Michael C Matthews, Encinitas, CA (US)

(73) Assignee: Ormet Circuits, Inc., San Diego, CA (US)

( * ) Notice: Subject to any disclaimer, the term of this patent is extended or adjusted under 35 U.S.C. 154(b) by 0 days.

(21) Appl. No.: 13/732,308

(22) Filed: Dec. 31, 2012

(65) Prior Publication Data

US 2014/0042212 A1   Feb. 13, 2014

Related U.S. Application Data

(60) Provisional application No. 61/681,526, filed on Aug. 9, 2012.

(51) Int. Cl.
*B23K 35/26* (2006.01)
*B22F 3/10* (2006.01)
*B23K 35/02* (2006.01)
(Continued)

(52) U.S. Cl.
CPC ............... *B23K 35/025* (2013.01); *B23K 1/20* (2013.01); *B23K 35/02* (2013.01); *B23K 1/0016* (2013.01); *B23K 1/008* (2013.01); *B23K 1/203* (2013.01); *B23K 2201/40* (2013.01); *B23K 2201/42* (2013.01); *B23K 35/26* (2013.01); *B23K 35/262* (2013.01); *B23K 35/264* (2013.01); *B23K 35/268* (2013.01); *B23K 35/30* (2013.01); *B23K 35/3006* (2013.01); *B23K 35/302* (2013.01);
(Continued)

(58) Field of Classification Search
USPC ................................................. 75/252; 148/24
See application file for complete search history.

(56) References Cited

U.S. PATENT DOCUMENTS 4,642,160 A   2/1987   Burgess
4,645,733 A   2/1987   Sullivan
(Continued)

FOREIGN PATENT DOCUMENTS

EP   0568930   3/1998
JP   53-133799   11/1978
(Continued)

OTHER PUBLICATIONS

WIPO, "International Search Report for PCT/US13/54230", pp. 1-10 (Dec. 9, 2013).

*Primary Examiner* — George Wyszomierski
*Assistant Examiner* — Ngoclan T Mai
(74) *Attorney, Agent, or Firm* — The Law Office of Jane K. Babin, Professional Corporation; Jane K. Babin (57) ABSTRACT

Transient liquid phase sintering compositions comprising one or more high melting point metals and one or more low melting temperature alloys are known in the art as useful compositions for creating electrically and/or thermally conductive pathways in electronic applications. The present invention provides transient liquid phase sintering compositions that employ non-eutectic low melting temperature alloys for improved sintering and metal matrix properties.

35 Claims, 5 Drawing Sheets

(51) Int. Cl.
  *B23K 1/20* (2006.01)
  *B23K 1/00* (2006.01)
  *B23K 1/008* (2006.01)
  *B23K 35/30* (2006.01)

(52) U.S. Cl.
  CPC ......... *B23K 35/3033* (2013.01); *B23K 35/0244* (2013.01); *B22F 3/1035* (2013.01)

(56) References Cited

U.S. PATENT DOCUMENTS

| | | | |
|---|---|---|---|
| 4,802,951 A | 2/1989 | Clark et al. | |
| 4,897,338 A | 1/1990 | Spicciati et al. | |
| 4,921,777 A | 5/1990 | Fraenkel et al. | |
| 5,043,102 A | 8/1991 | Chen et al. | |
| 5,088,189 A | 2/1992 | Brown | |
| 5,376,403 A | 12/1994 | Capote et al. | |
| 5,463,190 A | 10/1995 | Carson et al. | |
| 5,565,267 A | 10/1996 | Capote et al. | |
| 5,639,556 A | 6/1997 | Gaumet | |
| 5,716,663 A | 2/1998 | Capote et al. | |
| 5,830,389 A | 11/1998 | Capote et al. | |
| 5,853,622 A | 12/1998 | Gallagher | |
| 5,922,397 A | 7/1999 | Brandt et al. | |
| 5,948,533 A | 9/1999 | Gallagher et al. | |
| 5,980,785 A | 11/1999 | Xi et al. | |
| 6,054,761 A | 4/2000 | McCormack et al. | |
| 6,068,782 A | 5/2000 | Brandt et al. | |
| 6,085,415 A | 7/2000 | Gandhi et al. | |
| 6,114,413 A | 9/2000 | Kang et al. | |
| 6,127,619 A | 10/2000 | Xi et al. | |
| 6,132,646 A | 10/2000 | Zhou et al. | |
| 6,139,777 A | 10/2000 | Omoya et al. | |
| 6,143,116 A | 11/2000 | Hayashi et al. | |
| 6,207,259 B1 | 3/2001 | Iino et al. | |
| 6,281,448 B1 | 8/2001 | Tsukamoto | |
| 6,297,559 B1 | 10/2001 | Call et al. | |
| 6,337,522 B1 | 1/2002 | Kang et al. | |
| 6,370,013 B1 | 4/2002 | Iino et al. | |
| 6,673,134 B2 * | 1/2004 | Hanawa et al. | 75/255 |
| 6,673,190 B2 | 1/2004 | Haas et al. | |
| 6,716,036 B2 | 4/2004 | Gandhi | |
| 6,805,726 B1 * | 10/2004 | Wolf | 75/338 |
| 6,896,172 B2 | 5/2005 | Taguchi et al. | |
| 7,022,266 B1 | 4/2006 | Craig | |
| 7,169,209 B2 | 1/2007 | Nakata et al. | |
| 7,214,419 B2 | 5/2007 | Umeda et al. | |
| 8,221,518 B2 | 7/2012 | Shearer et al. | |
| 2001/0044590 A1 | 11/2001 | Ceriani et al. | |
| 2002/0051728 A1 | 5/2002 | Sato et al. | |
| 2002/0171157 A1 | 11/2002 | Soga et al. | |
| 2003/0234074 A1 | 12/2003 | Bhagwagar | |
| 2004/0217152 A1 | 11/2004 | Taguchi et al. | |
| 2004/0265608 A1 | 12/2004 | Pecorini et al. | |
| 2008/0023665 A1 | 1/2008 | Weiser et al. | |
| 2008/0207814 A1 | 8/2008 | Wrosch et al. | |
| 2009/0155608 A1 | 6/2009 | Nomura et al. | |
| 2010/0230145 A1 | 9/2010 | Holcomb | |
| 2010/0252616 A1 | 10/2010 | Shearer et al. | |
| 2011/0171372 A1 | 7/2011 | Shearer et al. | |

FOREIGN PATENT DOCUMENTS

| | | |
|---|---|---|
| JP | 10190159 | 7/1998 |
| JP | 3187373 | 7/2001 |
| JP | 2001326458 | 9/2001 |
| JP | 2002261105 | 9/2002 |
| KR | 1020050083640 | 8/2005 |
| WO | 9839105 | 9/1998 |
| WO | 9965086 | 12/1999 |
| WO | 0059645 | 10/2000 |
| WO | 2010114874 A2 | 10/2010 |
| WO | 2010114874 A3 | 10/2010 |
| WO | 2011078918 A3 | 7/2011 |
| WO | 2011078918 A2 | 10/2011 |

* cited by examiner

ELECTRICALLY CONDUCTIVE COMPOSITIONS COMPRISING NON-EUTECTIC SOLDER ALLOYS

RELATED APPLICATIONS

This application claims the benefit of priority under 35 USC §119 of U.S. Provisional Application Ser. No. 61/681,526 filed Aug. 8, 2012, the entire disclosure of which is incorporated herein by reference.

FIELD OF THE INVENTION

The present invention relates to metal compositions, methods of preparation and uses therefor. More specifically, the present invention relates to conductive metal compositions utilizing non-eutectic alloys.

BACKGROUND

Sintering is a process in which adjacent surfaces of metal powder particles are bonded by heating. Liquid phase sintering is a special form of sintering during which solid powder particles coexist with a liquid phase. Densification and homogenization of the mixture occur as the metals diffuse into one another and form new alloy and/or intermetallic species.

In transient liquid phase sintering (TLPS) of powders, the liquid phase only exists for a short period of time as a result of the homogenization of the metals to form a mixture of solid alloy and/or intermetallic species. The liquid phase has a very high solubility in the surrounding solid phase, thus diffusing rapidly into the solid, and eventually solidifying. Diffusional homogenization creates the final composition without the need to heat the mixture above its equilibrium melting point.

In TLPS compositions comprising powder metallurgy, a relatively low melting point (LMP) alloy and a relatively high melting point (HMP) metal are mixed in particulate form. At least one element within the alloy is either highly soluble in, or is reactive with, the receptive HMP metal. As the temperature is raised to the melting point of the LMP alloy, the alloy particles become molten. This transition can be observed as an endothermic event in differential scanning calorimetry (DSC). The reactive element(s) within the relatively low melting alloy then react with the receptive high melting point metal to form new alloy compositions and/or intermetallics. The formation of intermetallic species may be observed as an exothermic event using DSC. Thus, the typical TLPS DSC "signature" is an endotherm followed by an exotherm. The diffusion and reaction of the reactive element(s) from the low melting alloy and the receptive high melting metal continues until one of the reactants is fully depleted, there is no longer a molten phase at the process temperature, or the reaction is quenched by cooling. After cooling, subsequent temperature excursions, even beyond the original LMP alloy melt temperature, do not reproduce the original melt signature of the mixture. This is the "signature" of a typical low temperature transient liquid phase sintered metal mixture.

TLPS technology is used to produce organo-metallic conductive compositions that include HMP metal powder(s), LMP metal alloy powder(s), and a permanent adhesive-flux polymer system. TLPS compositions are employed, for example, to form conductive paths on printed circuits by creating a patterned deposition of the TLPS composition, and then simultaneously sintering the metallic components and curing the adhesive/polymer components in the composition by heating at relatively low temperature. During heating, the adhesive-flux polymer fluxes the metal powders, allowing TLPS to occur. After heating, the adhesive-flux chemically binds the resultant metal oxides, rendering them harmless. For this reason, these compositions provide good electrical conductivity with little opportunity for conductivity deterioration due to oxidation, corrosion or thermal expansion and contraction.

The microstructure of processed TLPS compositions appears as a network of particles of HMP metal, each bearing one or more "shells" of the newly formed alloy/intermetallic compositions, which are in turn interconnected by the non-reactive portion of the original LMP alloy. Open areas of the metallic network structure are generally filled with the cured polymeric binder. Reaction between the HMP metal and the reactive element(s) of the LMP alloy may result in either partial or complete incorporation of the HMP metal particles into the newly formed alloy and/or intermetallic species. The number and nature of the new alloy and/or intermetallic species that form is dependent on the selection of metallic constituents in the TLPS composition, their relative proportions, the particle size distribution and the process temperature. The composition of the residual components of the original LMP alloy is likewise dependent on these factors.

TLPS compositions are suitable replacements for conventional electrically and/or thermally conductive materials in a diverse assortment of applications, including assembly of electronic components, deposition of in-plane circuit traces, interconnection of circuit traces on different planes, assembly of unpackaged integrated circuit die onto packaging elements, and the like. For each of these applications, there is a specific set of application-specific attributes for which TLPS compositions confer an advantage over conventional materials. Attributes include, but are not limited to, ease of deposition, reduction in manufacturing time or complexity, increased circuit density in the resultant article, and production of environmentally stable interfaces that have high electrical and/or thermal conductivity.

However, in each of these applications the TLPS compositions directly contact, and in some instances are surrounded by, materials with different mechanical characteristics and coefficients of thermal expansion (CTE). Typically, it is desirable for the TLPS composition to sinter with adjacent metallic circuit and/or electronic component elements in the electronic device as well as within the composition itself. Although reaction between the TLPS composition and adjacent TLPS-receptive elements confers protection of the interface from some environmental interference, it also mechanically couples the composition to the adjacent elements, which may be either beneficial or detrimental depending on the application. Further, in several applications, the TLPS material is used under circumstances in which a polymeric component (e.g. circuit substrates in printed circuit boards) imposes an upper limit to the process temperature and duration, and thus restricts the selection of LMP alloy(s) to those that are compatible with the polymer. In addition, such polymer constituents may have substantially different CTE than the TLPS composition, and other surrounding elements, and may be exposed to large changes in CTE during process steps in which the glass transition temperature of such polymeric constituents is exceeded. These factors must be taken into account in order to provide a durable, reliable end product.

The demands on the metallic constituents in TLPS applications are high. Some of the critical features of the metallurgy include:

The melting point of the LMP alloy must be sufficiently low that processing of the composition does not damage the surrounding materials.

The LMP alloy and HMP metal must form species that are good electrical and/or thermal conductors.

The reaction products of the LMP alloy and HMP metal must be stable over the likely thermal exposure range.

The metallic network formed by the TLPS process must be resistant to the deleterious effects of mechanical stress.

The LMP alloy must be compatible and reactive with the metal finishes of the circuit elements to be connected.

The primary constituent LMP and HMP metals should be readily available at a reasonable cost.

The constituents should not be restricted due to environmental or toxicity concerns.

The optimum choice for the HMP metal is typically copper, although some alternatives may be useful in specific applications (e.g. resistors). Copper, which has a melting point in excess of 1000° C., is relatively inexpensive, plentiful, readily available in a variety of powder forms, compatible with the metallurgy typically used for circuit elements, ductile, and is an excellent electrical and thermal conductor. Although more expensive, silver, indium, gold, and germanium are also suitable HMP metals for use in TLPS composition. Aluminum is also contemplated.

The selection of a suitable LMP alloy material is more challenging. The first challenge is process temperature. The process temperature for TLPS compositions in the electronics industry must be low enough that the other materials used in the production of an electronic article are not damaged. For electronic applications that include polymeric components, a ceiling of 250° C. is typically the maximum permissible process temperature and therefore, the low melting temperature alloy is generally limited to alloys of tin, bismuth, lead, gallium, indium, and zinc. Alloys of lead are excluded due to toxicity. Alloys of gallium and indium are prohibitively expensive and not readily available. Alloys of zinc are incompatible with many common circuit finishes. However, alloys of tin with bismuth have reduced melting temperatures as compared to tin alone, and may therefore present the best combination of attributes, although the addition of other elements may be desirable to achieve specific characteristics.

Alloys of bismuth and tin meet many of the objectives outlined above; however, they also present some deficiencies. Bismuth-tin alloys are readily available at reasonable cost in particulate form. The tin in the bismuth-tin alloys, and the intermetallics formed when tin reacts with copper, are all very good electrical and thermal conductors. The residual, elemental bismuth and the copper-tin intermetallics formed during a TLPS reaction all present melting temperatures outside the range of subsequent thermal processing and testing typically performed. Tin and bismuth are not considered toxic and are compatible with all commonly used metal circuit finishes. Unfortunately, both bismuth and copper-tin intermetallics are brittle and therefore susceptible to damage when exposed to mechanical stress. Further, elemental bismuth is a poor electrical conductor and a very poor thermal conductor.

As alloys of bismuth and tin used in conjunction with copper as the HMP metal offer most of the desired characteristics, it would be advantageous to provide a means to employ this metallurgy in a manner that minimizes its deficiencies. Bismuth is at least partially responsible for the primary deficiencies of low electrical and thermal conductivity, and brittleness. Therefore, it would be desirable to minimize the proportion of bismuth in TLPS compositions used in electronic applications.

SUMMARY OF THE INVENTION

The present invention provides TLPS compositions that include at least one first particle comprising at least one high-melting-point metal (M); and at least one second particle that includes a low-melting-temperature alloy of a first metallic element (X) that is non-reactive with M, and a second metallic element (Y) that is reactive with M, such that X and Y are present in a non-eutectic proportion in the low-melting-temperature alloy, and an organic vehicle. The proportion of X in the low-melting temperature alloy in the composition is less than 68% by weight of the proportion of X in the eutectic alloy of X and Y, but can be less, such as 65%, 55%, or 45% by weight.

The composition can contain only a single type of first particle (i.e., containing only one weight high melting point metal M) or more than one type, (e.g., containing different high melting point metals, or particles of different sizes, shapes etc.).

Similarly, the composition can contain a single type of second particle or multiple types, which can include different alloy compositions, additional elements, coatings, sizes, shapes and the like. However, in certain aspects of the invention, the composition does not contain the eutectic alloy of X and Y The low-melting-temperature alloy will generally have a liquidus temperature at least 5° C. higher than the melting temperature of a eutectic alloy of X and Y, and in some instances the liquidus temperature is less than 50° C. above the melting temperature of the eutectic alloy of X and Y. The onset of melting of the low-melting-temperature alloy is typically equal to the melting temperature of the eutectic alloy of X and Y.

High melting point metal M can be, for example, copper, silver, gold, palladium, nickel, aluminum or a combination of these elements, and is typically copper.

Low melting point metal Y can be, for example, tin, bismuth, zinc, gallium, indium, tellurium, mercury, thallium, antimony, selenium, polonium or a combination of these elements, and is typically tin.

The facilitator element X can be, for example, bismuth, indium, lead, silver, copper, antimony, gold, nickel or a combination of these elements, and is typically bismuth.

The low-melting-temperature, non-eutectic alloy can be a binary alloy consisting of only X and Y. Exemplary binary eutectic alloys include $Sn_{42}/Bi_{58}$, $Sn_{48}/In_{52}$, $Ag_3/Bi_{97}$, $Ag_3/In_{97}$, and $Sn_{63}/Pb_{37}$. Exemplary binary eutectic alloys include $Sn_{(68-90)}/Bi_{(10-32)}$, $Sn_{(80-95)}/Pb_{(5-20)}$, $Sn_{(62-90)}/In_{(10-38)}$, $Bi_{(30-65)}/Ag_{(35-70)}$, and $In_{(30-65)}/Ag_{(35-70)}$ and $Bi_{52}/Pb_{30}/Sn_{18}$.

In some embodiments, M is copper, silver or aluminum, and the low melting temperature alloy is selected from the group consisting of $Sn_{(68-90)}/Bi_{(10-32)}$, $Sn_{(50-95)}/Pb_{(5-20)}$, $Sn_{(62-90)}/In_{(10-38)}$, $Bi_{(30-65)}/Ag_{(35-70)}$, and $In_{(30-65)}/Ag_{(35-70)}$ and $Bi_{52}/Pb_{30}/Sn_{18}$. In other embodiments, M is copper and the low melting temperature alloy is $Sn_{(70-90)}/Bi_{(10-30)}$.

In other aspects of the invention, the low-melting-temperature, non-eutectic alloy can be a ternary alloy that also includes a third metallic element (Z), such as $Bi_{52}/Pb_{30}/Sn_{18}$. Z can be, for example, Pb, Cu, Ag, Sb, In, Bi, Zn, Ga, Ni or a combination of these elements, and when present, is most frequently Cu, Ni, Ag or Pb.

In certain embodiments of the invention, the particles of the TLPS compositions of the invention can include coating, such as a saturated fatty acid, an unsaturated fatty acid, a metal, a metal alloy, an inorganic metal salt, an organic metal salt, a metal alkoxide, and a triazole.

The present invention also provides methods for preparing the TLPS composition disclosed herein, by:

a) providing a high-melting-point metal M in particulate form, a low-melting-temperature alloy in particulate form, and an organic vehicle, and b) combining the particles and organic vehicle in the following proportions, based on the total weight of the composition:
   i) between about 20 wt. % and about 70 wt. % of the least one high-melting-point metal M in particulate form;
   ii) between about 20 wt. % and about 70 wt. % of the least the at least one low-melting-temperature alloy in particulate form;
   iii) between about 1% and about 30 wt. % of the organic vehicle, thereby preparing the TLPS composition.

Providing the low-melting-temperature alloy in particulate may require preparing a particulate form of the alloy, which can be accomplished by mixing the first metallic element X in a molten state with the non-eutectic proportion of the second metallic element Y in a molten state to form an alloy; and atomizing the alloy to form particles.

Also provided by the invention are methods of forming a mechanical connection, a conductive connection or a conductive circuit in an electrical assembly by applying a TLPS composition disclosed herein to at least one element of an electronic assembly, and heating the element to a process temperature, $T_1$, such that the high melting point metal M forms intermetallic species with the reactive, low melting point metal Y. The elements that can be connected include, but are not limited to semiconductor dies, a packaging elements, packaged semiconductor components, printed circuit boards, electronic substrates, stacked die, circuit traces, circuit layers, collection grids, solar panels, electrically conductive pillars, electrically conductive cylinders, electrically conductive columns, and electrical subsystems. Application of the TLPS composition can be by any suitable method known in the art, such as needle dispensing, stenciling, screen printing, ink jetting, extrusion, casting, and spraying.

DETAILED DESCRIPTION OF THE INVENTION

It is to be understood that both the foregoing general description and the following detailed description are exemplary and explanatory only and are not restrictive of the invention claimed.

The section headings used herein are for organizational purposes only and are not to be construed as limiting the subject matter described.

DEFINITIONS

As used herein, "or" means "and/or" unless stated otherwise. Furthermore, use of the term "including" as well as other forms, such as "includes," and "included," is understood as "comprising" and is not limiting. It is to be understood that as used in the specification and in the claims, the singular form of any word can also refer to the plural, depending upon the context in which it is used. For example, "a" or "an" can mean one or more, depending upon the context in which it is used. Thus, reference to "a metal" can mean at least one metal, two metals, or a plurality of metals.

"About" or "approximately" as used herein, means that a number referred to as "about" or "approximately" comprises the recited number plus or minus 1-10% of that recited number. For example, about 50 degrees can mean 45-55 degrees or as few as 49-51 degrees depending on the situation. Whenever it appears herein, a numerical range, such as "45-55", refers to each integer in the given range; e.g., "45-55%" means that the percentage can be 45%, 46%, etc., up to and including 55%. Where a range described herein includes decimal values, such as "1.2% to 10.5%", the range refers to each decimal value of the smallest increment indicated in the given range; e.g. "1.2% to 10.5%" means that the percentage can be 1.2%, 1.3%, 1.4%, 1.5%, etc. up to and including 10.5%; while "1.20% to 10.50%" means that the percentage can be 1.20%, 1.21%, 1.22%, 1.23%, etc. up to and including 10.50%.

As used herein, the term "substantially" refers to a great extent or degree. For example, "substantially all" typically refers to at least about 90%, frequently at least about 95%, often at least 99%, and more often at least about 99.9%.

The term "alloy" refers to a mixture containing two or more metals, and optionally additional non-metals, where the elements of the alloy are fused together or dissolved into each other when molten. The notation used herein for alloy compositions lists two or more elements using their IUPAC symbols separated by a forward slash ("/"). When given, the proportions of the elements in the alloy are indicated by subscripts corresponding to the weight percent of the element in the alloy. For example, Sn/Bi represents an alloy of tin (Sn) and bismuth (Bi), which can be any proportion of these two elements. $Sn_{60}/Bi_{40}$ represents a specific alloy of tin and bismuth that contains 60 percent by weight of tin and 40 percent by weight of bismuth. Where a range is given for the weight percent of an element(s) in an alloy, the range indicates that the element can be present in any amount within the indicated range. For example, $Sn_{(70-90)}/Bi_{(10-30)}$ refers to an alloy containing from 70 weight percent to 90 weight percent of tin, and from 10 weight percent to 30 weight percent of bismuth. Thus, alloys encompassed by the "$Sn_{(70-90)}/Bi_{(10-30)}$" range include, but are not limited to: $Sn_{70}/Bi_{30}$, $Sn_{71}/Bi_{29}$, $Sn_{72}/Bi_{28}$, $Sn_{73}/Bi_{27}$, $Sn_{74}/Bi_{26}$, $Sn_{75}/Bi_{25}$, $Sn_{76}/Bi_{24}$, $Sn_{77}/Bi_{23}$, $Sn_{78}/Bi_{22}$, $Sn_{79}/Bi_{21}$, $Sn_{80}/Bi_{20}$, $Sn_{81}/Bi_{19}$, $Sn_{82}/Bi_{18}$, $Sn_{83}/Bi_{17}$, $Sn_{84}/Bi_{16}$, $Sn_{85}/Bi_{15}$, $Sn_{86}/Bi_{14}$, $Sn_{87}/Bi_{13}$, $Sn_{88}/Bi_{12}$, $Sn_{89}/Bi_{11}$, and $Sn_{90}/Bi_{10}$. Furthermore, $Sn_{(70-90)}/Bi_{(10-30)}$ represents alloys in which the specific proportion of the elements Sn and Bi may vary from $Sn_{70}/Bi_{30}$ to $Sn_{90}/Bi_{10}$ inclusive of proportions of Sn varying from 70 up to 90 weight percent and Bi inversely varying from 30 down to 10 weight percent.

"Flux" as used herein, refers to a substance, often an acid or base, used to promote fusing of metals and in particular, removes and prevents the formation of metal oxides.

The terms "melting temperature" or "melting point," as used herein, refer to the temperature (a point) at which a solid becomes a liquid at atmospheric pressure.

The terms "high melting temperature metal", "high melting point metal" or "HMP metal" as used herein, refer to a metal having a melting temperature that is equal to, or higher than, about 400° C. HMP metals include Cu, Ag, Pd, Au, Al, Ni, Be, Rh, Co, Fe, Mo and Pt. Typically, the HMP metal used in the compositions of the present invention is Cu, Ag, Pd, Au, Al, Ni or Pt, and most frequently the HMP metal is either Cu or Ag.

The terms "low melting temperature metal", "low melting point metal" or "LMP metal" as used herein, refer to a metal having a melting temperature that is lower than about 400° C. Exemplary LMP metals include Sn, Bi, Zn, Ga, In, Te, Hg, Tl, Sb, Se, Po, Pb, Cd, and Po in an alloy of these metals. Typically, the LMP metal used in the compositions of the present invention is Sn, Bi, Pb, Ga, In or Zn, and most frequently the LMP is Sn in a non-eutectic alloy.

The term "solidus" refers to the temperature below which a given substance is completely solid (crystallized). The solidus quantifies the temperature at which melting of a substance begins, but is not necessarily melted completely, i.e., the solidus is not necessarily a melting point. For this distinction, the solidus may be contrasted to the "liquidus", which specifies the maximum temperature at which crystals can co-exist with molten substance. Above the liquidus temperature the material is homogeneous and liquid at equilibrium. Below the liquidus temperature more and more crystals may form. The solidus and liquidus temperatures do not align or overlap in all cases. If a gap exists between the solidus and liquidus temperatures, it is called the "freezing range" or "mush range", and within that gap, the substance consists of a mixture of solid and liquid phases. See e.g., FIG. 5.

Figure 1:
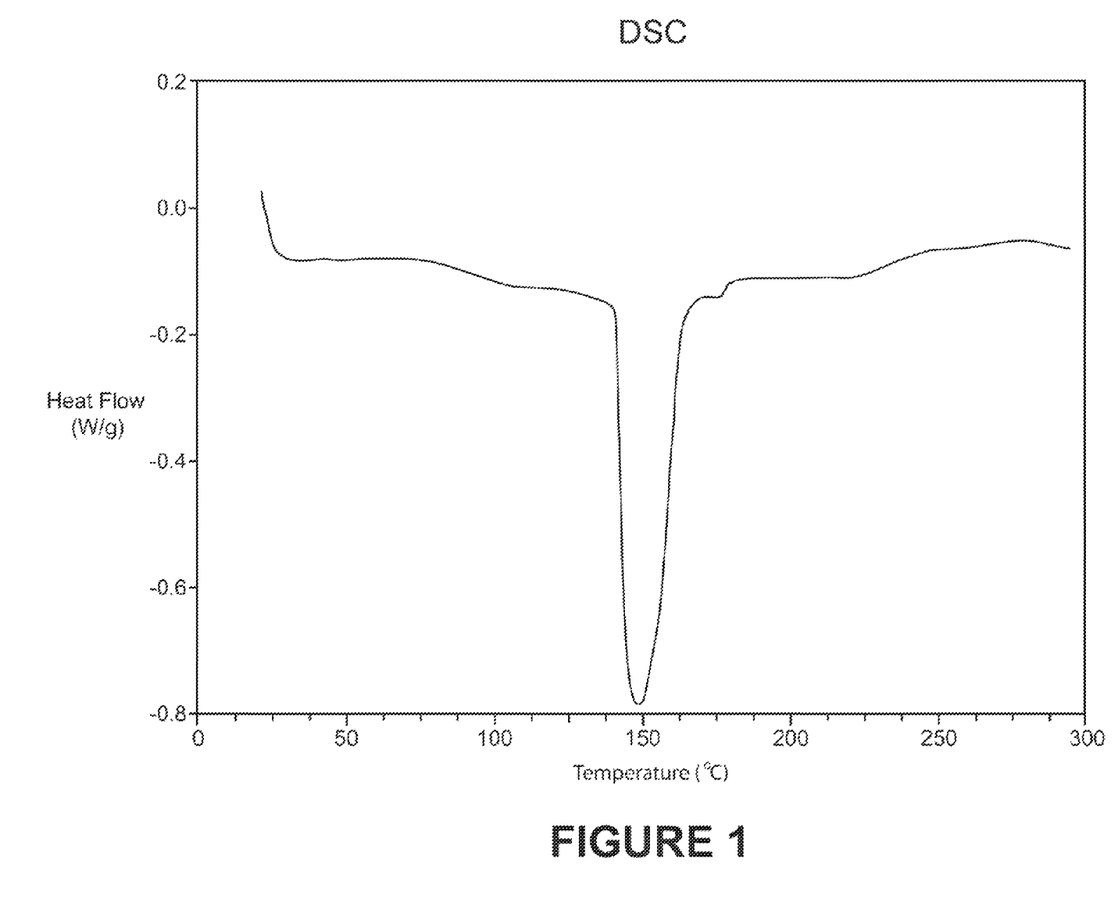
FIG. 1 shows a DSC scan showing the typical melt signature of particles of eutectic tin-bismuth. Note the single sharp peak that is characteristic of a eutectic alloy melt.

The term "eutectic" refers to a mixture or an alloy in which the constituent parts are present in such proportions that the constituents melt simultaneously, and the melting point is as low as possible. Accordingly, a eutectic alloy or mixture solidifies at a single temperature. In eutectic mixtures the solidus and liquidus temperatures are identical, i.e., the mixture melts completely at one temperature, the eutectic point. See e.g., FIG. 1. The skilled artisan will appreciate that for a specific combination of two metals, there is typically only one proportion that is eutectic.

Figure 2:
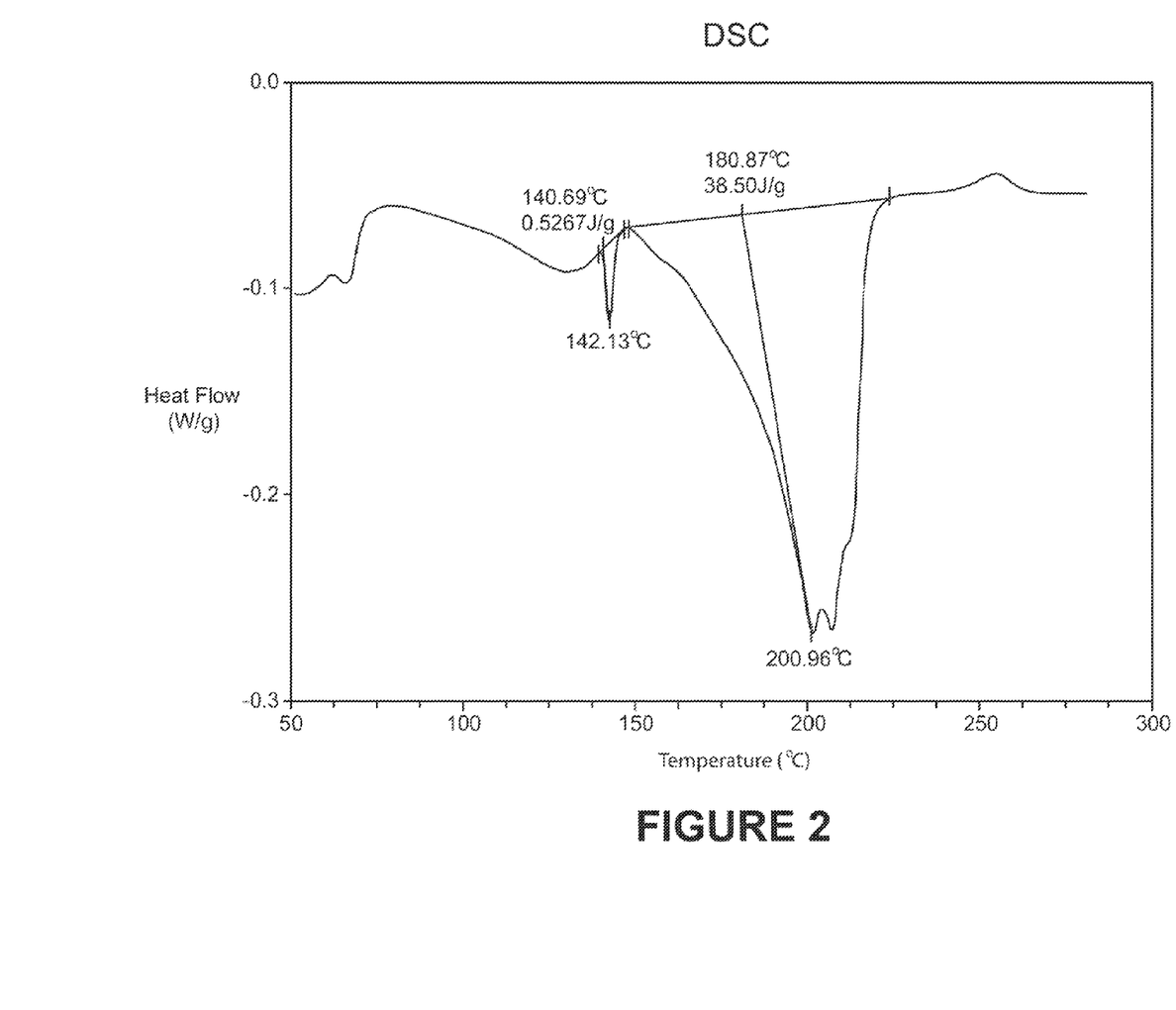
FIG. 2 shows a DSC scan of particles of a non-eutectic alloy composition of tin and bismuth processed under the same conditions as the DSC scan of FIG. 1. Note the significant broadening of the temperature range over which the melt occurs and the suggestion of more than one melting peak.

The term "non-eutectic" refers to a mixture or an alloy that does not possess eutectic properties. Accordingly, when a non-eutectic alloy solidifies, its components solidify at different temperatures, and the overall composition exhibits a melting range. See e.g., FIG. 2.

The term "differential scanning calorimetry" ("DSC") refers to a method of thermal analysis in which the difference in the amount of heat required to increase the temperature of a sample and reference are measured as a function of temperature. DSC is used to investigate the melting behavior of non-eutectic alloy particles and the reaction signature of TLPS pastes formulated with eutectic vs. non-eutectic alloys.

The term "sintering" refers to a process in which adjacent surfaces of metal powder particles are bonded by heating. "Liquid phase sintering" refers to a form of sintering in which the solid powder particles coexist with a liquid phase. Densification and homogenization of the mixture occur as the metals diffuse into one another and form new alloy and/or intermetallic species.

In "transient liquid phase sintering" or "TLPS", the liquid phase exists for a only short period of time as a result of the homogenization of the metals to form a mixture of solid alloy and/or intermetallic species. The liquid phase has a very high solubility in the surrounding solid phase, thus diffusing rapidly into the solid and eventually solidifying. Diffusional homogenization creates the final composition without the need to heat the mixture above the solidus temperature of the HMP metal.

"Solder" is a fusible metal alloy used to join together metal parts and having a melting point below that of the workpiece(s). Solder has a characteristic melting behavior that does not change substantially with repeated heat/cool cycles. Solder can include eutectic or non-eutectic alloys, but eutectic alloys are preferred for joining applications because the joints solidify quickly. TLPS differs from solder due to the presence of a HMP metal in TLPS compositions, which interact with a reactive LMP metal in the TLPS low melting temperature alloy to form crystalline intermetallics with specific stoichiometric proportions and much higher melting temperatures than the original TLPS composition. Thus, TLPS compositions generally do not remelt at the original process temperature. Although intermetallics can form within solder and between solder and elements in joined surfaces (e.g. copper pads), they represent only a small proportion of the soldered joint (<5%). Therefore, applied solder can be remelted under substantially the same conditions as the original application.

The "Coefficient of Thermal Expansion" or "CTE" is a term of art describing a thermodynamic property of a substance. The CTE relates a change in temperature to the change in a material's linear dimensions. As used herein "$\alpha_1$ CTE" or "$\alpha_1$" refers to the CTE before the $T_g$, while "$\alpha_2$ CTE" refers to the CTE after the $T_g$.

The term "processing temperature" or "$T_1$" as used herein in reference to TLPS compositions is a temperature at which two reactive metals (e.g. Cu and Sn) form intermetallic species.

The terms "intermetallics" or "intermetallic species" refer to a solid material, which is comprised of two or more metal atoms in a certain proportion, that has a definite structure which differs from those of its constituent metals.

As discussed above, there is need to provide TLPS compositions that comprise the minimum quantity of facilitator element X necessary to promote the full reaction between HMP metal M and reactive metal element Y at a given process temperature. The present invention is based on the observation that these goals can be achieved by formulating TLPS compositions with a higher percentage of the reactive metallic element in the low melting temperature (LMP) alloy, resulting in post-processing products that are stronger and more electrically conductive than those containing a greater amount of facilitator element Y. See e.g., U.S. Pat. No. 8,221, 518 to Shearer et al., the entire contents of which is incorporated by reference herein for any purpose.

In standard transient liquid phase sintering powder metallurgy, a relatively low melting point (LMP) metal alloy and a relatively high melting point (HMP) metal are mixed in particulate form. At least one element within the LMP alloy is reactive with the HMP metal. As the temperature is raised to the processing temperature, the LMP alloy particle types become molten. The reactive element(s) within the LMP alloy then react with the receptive HMP metal to form intermetallics, and the residual LMP alloy constituents form new alloy compositions. The diffusion and reaction of the reactive element from the LMP alloy and the receptive HMP metal continues until at least one of the reactants is either fully depleted, there is no longer a molten phase at the process temperature, or the reaction is quenched by cooling the mixture.

The inventors have previously demonstrated that blending a LMP alloy with excess of reactive LMP metal in elemental or highly enriched form vastly improves the amount of both HMP and LMP metals that are converted to intermetallics during TLPS. See U.S. Pat. No. 8,221,518. The present invention extends these observations to compositions in which the excess reactive LMP metal is present in the LMP alloy itself, rather than in a separate particle. The inventors observed that incorporating the excess of reactive LMP metal into a single alloy particle rendered the TLPS reaction autocatalytic. As the solidus of the LMP metal is exceeded, the reactive LMP metal begins to react with the HMP metal to form intermetallics. The composition of the LMP metal is therefore dynamic during the TLPS reaction, becoming more like the eutectic composition as the reactive LMP metal in the molten phase is depleted. As the LMP alloy composition approaches that of the eutectic, the LMP alloy become more fluid and reacts more effectively with the available HMP metal. Once initiated, the TLPS reaction becomes autocatalytic due to the dynamic composition of the LMP metal alloy. In particular, the suitability of using non-eutectic alloys containing an high percentage of LMP metal in TLPS compositions is demonstrated by the experimental examples described in the present specification.

Non-Eutectic Alloys

The use of alloys substantially different from the eutectic composition has unfavorable consequences in solder joining. The broad melting range of non-eutectic alloys requires that parts to be joined are immobilized for a longer time, resulting in longer cycle times than are necessary for eutectic alloy solders with sharp melting points. The longer dwell results in thicker intermetallic layers that are more prone to cracking along the laminar interface with circuit pads. Further, non-eutectic solder often does not wet as well as eutectic solder. The resultant joints are dull in appearance, which renders automated visual inspection more difficult than for shiny eutectic joints. For these reasons, alloys having a composition substantially different from eutectic proportions are viewed as unfavorable for solder joining.

In TLPS compositions, however, these characteristics are not detrimental and, in fact, non-eutectic solder alloys confer some unexpected benefits. Relatively long cycle times are the norm for TLPS materials in order to minimize voids from volatile organic components and to allow the integrated polymer adhesives to cure. Therefore, the longer process cycles required for non-eutectic alloys to solidify affords a better quality composite joint. The broad melting range of non-eutectic alloys also means a broad solidification range. If an excess amount of alloy is introduced into the TLPS composition such that unreacted alloy remains after processing, this residual alloy can repeatedly melt and resolidify without disrupting the intermetallic network. The broad solidification range of the non-eutectic alloy thus allows the metallic matrix to absorb CTE mismatch induced strain throughout the typical range of glass transition temperatures for the polymeric components typically used in electronic parts. The wetting behavior is less critical in TLPS compositions than in solder joining because individual particle and spot connections are made during TLPS, rather than the substantially laminar interfaces produced by soldering. Advantageously, poorer wetting prevents the TLPS composition from wetting beyond the desired contact area, thus preventing shorts. When processed, TLPS materials have an appearance similar to conductive adhesives and shiny joints are not expected or required by the industry for these materials.

The use of substantially non-eutectic alloy compositions allows low process temperature facilitator elements with otherwise detrimental characteristics (e.g. bismuth), to be minimized in the composition. In particularly small feature sizes, the use of a single type of non-eutectic alloy particle may be preferable to the strategy of blending alloys to minimize detrimental elements, as taught by Shearer et al., U.S. Pat. No. 8,221,518. Capturing the desired composition in a single particle limits the range of diffusion required from each particle in order to effectively interconnect the metallic network, and promotes better and more homogeneous sintering in feature geometries with a relatively small number of particles. Most advantageously, as the reactive element (e.g. tin) is depleted from the non-eutectic alloy by reaction with the HMP metal to create intermetallics, the melting temperature of the remainder is reduced, and both fluidity and wetting behavior are improved until the eutectic proportion of alloy elements is reached. Invention TLPS compositions selectively exploit these advantageous characteristics for performance superior to previously described TLPS compositions.

TLPS Compositions Containing Low-Melting Temperature, Non-Eutectic Alloys

The present invention provides TLPS compositions containing a low melting temperature, non-eutectic alloy XY combined with a reactive, high-melting-point (HMP) metal M. Advantageously, the TLPS compositions of the invention have improved properties, such as reliability and homogeneity, after processing at temperatures below 250° C. Non-eutectic alloy XY includes at least one facilitator metallic element X, that is non-reactive with M, and at least one low melting point (LMP) metallic element Y, that is reactive with M. In the alloy composition XY, Y is present in an increased proportion to X, relative to the proportions of these elements in the eutectic alloy of X and Y. At the non-eutectic proportions of the present invention, alloy XY demonstrates an onset of melting at the eutectic melting temperature, but has a melting range that is broader than the eutectic melting temperature by at least 5° C. In Shearer et al., U.S. Pat. No. 8,221,518 (the '518 patent), particles of an enriched form of the reactive metal Y were blended with particles of LMP alloy XY to effectively reduce the amount of X in the composition. Particles of the enriched form of reactive metal Y were incorporated into the TLPS reaction below the solidus temperature of the Y-enriched particles because the Y-enriched particles are soluble in the molten particles XY. In order for the Y-enriched particles to become incorporated into the TLPS reaction, the molten particles of LMP alloy XY must flow and wet the Y-enriched particles while also interacting with surrounding HMP metal particles. In the compositions described in '518 patent, the HMP metal particles can potentially impede wetting of the Y-enriched particles by the LMP alloy XY, both by physically blocking the particles and by reducing the flow of the LMP alloy XY as the reactive metal Y is depleted in TLPS reaction with M. As the proportion of Y in alloy XY is reduced through TLPS reaction with M, the proportion of X will exceed the eutectic composition and the melt flow will be reduced. Use of a single type of LMP particle of Y-enriched non-eutectic alloy XY minimizes any deleterious characteristics of facilitator element X (as increasing Y-containing particles did in the '518 patent). It also promotes a short diffusion pathway for reaction between Y and M, and thereby enables the composition to become fully reacted at a temperature near the eutectic melting point rather than requiring a processing temperature equal to or greater than the liquidus temperature for alloy XY.

In certain embodiments, alloy XY has a reduced proportion of X as compared to the eutectic alloy of the same elements. During TLPS, the reactive element, Y, forms intermetallics with the HMP metal, M, and therefore, Y is depleted from the available LMP alloy through TLPS processing. A key feature of the invention is that as Y is depleted from the LMP alloy, the composition of the non-eutectic alloy XY changes, becoming more similar to the eutectic; concomitantly its melting temperature range is reduced in situ towards the eutectic melting point as reactive element Y reacts with M. As the difference between the processing temperature and the melting temperature range of the alloy increases, the alloy becomes more fluid. In addition, the wetting behavior of the alloy improves as the dynamic composition becomes more like the eutectic. Both of these attributes promote better metallic network development as the residual fluid alloy permeates the network of solidified intermetallics to wet unreacted metal element M.

Figure 4:
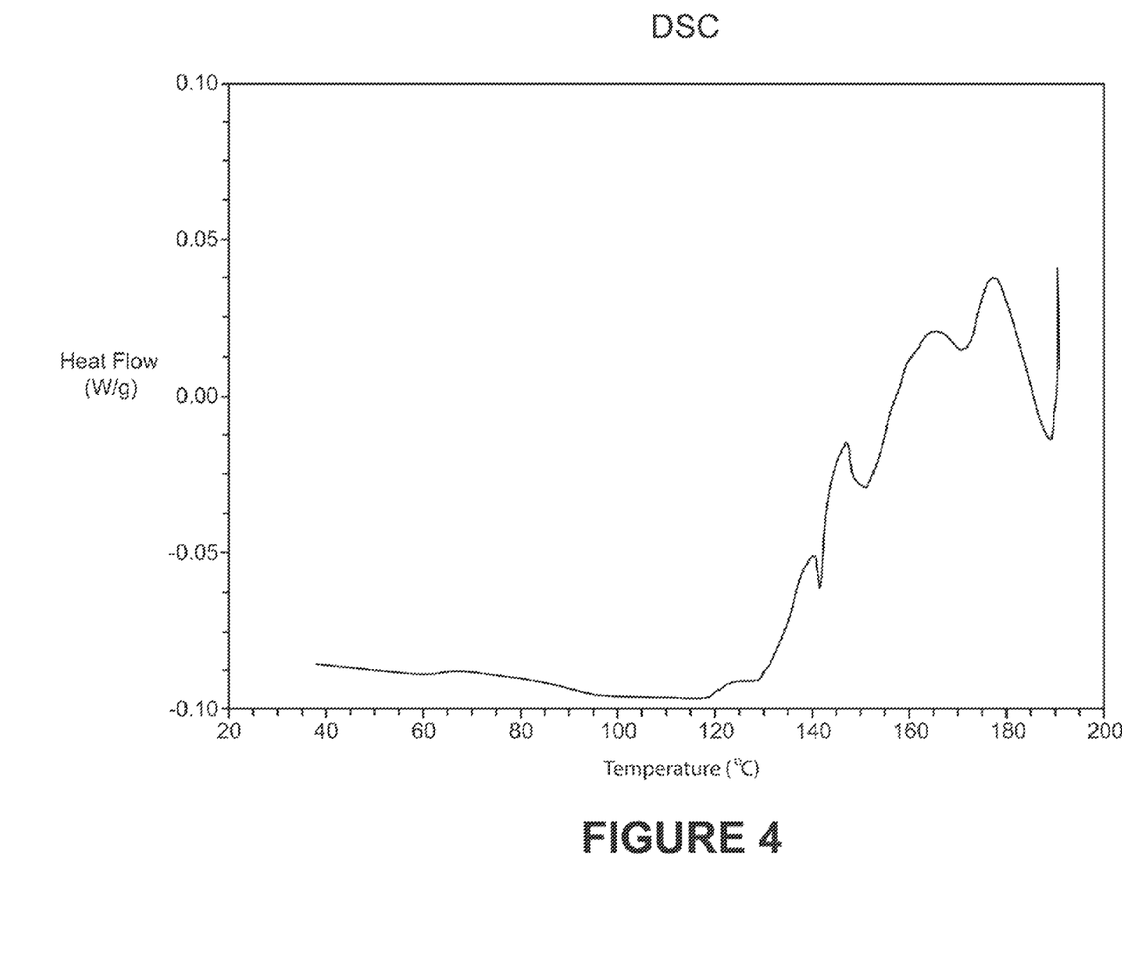
FIG. 4 shows a DSC scan of the same composition as in FIG. 3 except that the tin is delivered to the copper in the form of a single, non-eutectic alloy composition. Note that the sintering exotherm is so energetic that the onset of melting at the eutectic alloy point can hardly be seen. Also evident are the waves of reaction resulting from the depression of the effective melt temperature of the dynamic alloy composition as the tin reacts with the copper.
Figure 5:
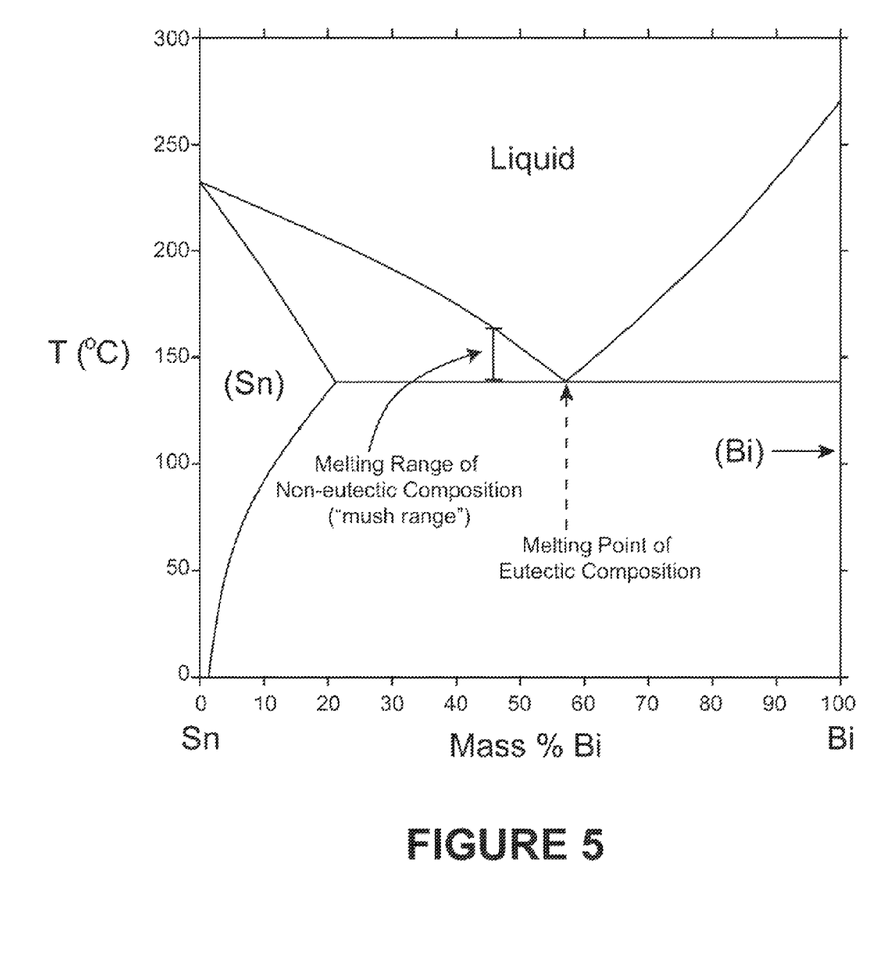
FIG. 5 is a binary phase diagram for tin and bismuth.

The relationship between solidus, liquidus, other melting properties and alloy composition can better be understood by reference to the phase diagram for alloys of tin and bismuth shown in FIG. 5. Alloy compositions comprising more than about 20 weight percent bismuth have an onset of melting at the melting temperature of the eutectic $Sn_{42}/Bi_{58}$ alloy (broken arrow), but require a higher temperature to become fully molten—i.e., have a high liquidus temperature. The difference between the liquidus temperature and the eutectic melt temperature is known as the mush range for the alloy (solid arrow). As can also be seen on the phase diagram shown in FIG. 5, as the proportion of bismuth increases from about 20 weight percent to 58 weight percent (the eutectic point), the liquidus temperature of the alloy decreases and the mush range becomes smaller. This characteristic is apparent in the DSC scan of FIG. 4 (discussed below) where the reaction between the tin and the copper effectively increases the proportion of bismuth in the dynamic alloy composition, resulting in waves of melting and continued sintering. Phase diagrams for other common alloy systems can be viewed on the world wide web at metallurgy.nist.gov/phase/solder/solder.html.

In certain embodiments, the invention provides TLPS compositions that include a first particle that contains a high-melting-point metal M, and a second particle that contains a low-melting-temperature alloy XY, where Y is a metallic element that is reactive with M, and X is a carrier or facilitator metallic element that does not react with M, all suspended in an organic vehicle. The X and Y components of the alloy in this embodiment are present in a non-eutectic proportion in which the proportion of X in the low-melting temperature alloy is less than 68% by weight of the proportion of X in the eutectic alloy of X and Y. In certain aspects, the first particle type can include one or more additional high melting point metals, and/or can include a mixture of HMP metal particles. Similarly, the second particle type can be homogeneous or can include one or more additional alloys of Y or other LMP metals that are reactive with M.

Therefore, in certain aspects of the invention, the TLPS compositions include one or more first particles that contain one or more high-melting-point metal(s) M; one or more second particles that contain one or more low-melting-temperature alloy(s) XY, of a first metallic element (or elements) X that is non-reactive with M, and at least one second metallic element (or elements) Y that is reactive with M, such that Y is present in a non-eutectic proportion with metallic element X in the alloy; and, an organic vehicle. More specifically, the proportion of X in the non-eutectic alloy is less than 68 weight of proportion of X in a eutectic alloy of X and Y.

In certain embodiments, the liquidus temperature of the low melting temperature, non-eutectic alloy is 5° C. or more above the eutectic melting point, e.g. at least 10° C., at least 15° C., at least 20° C., at least 25° C., at least 30° C., at least 35° C., at least 40° C., at least 45° C., or more above the melting point of a eutectic alloy of X and Y. In some embodiments of the invention, the liquidus temperature of the low melting temperature alloy is less than 50° C. above the melting temperature of the eutectic alloy of X and Y. Thus, in certain aspects, the liquidus temperature of the low melting temperature alloy is between 5° C. and about 50° C. above the melting temperature of the eutectic alloy. In typical embodiments, the liquidus of the low melting temperature, non-eutectic alloy is lower than the process temperature, $T_1$, by at least about 5° C., 10° C., 20° C., 30° C., 40° C., 50° C. or more.

Typically, the onset of melting of the low-melting-temperature, non-eutectic alloy XY is at or about the melting point of a eutectic alloy of X and Y. Thus, in certain embodiments, the low-melting-temperature, non-eutectic alloy has melting temperature range spanning about 5° C. to about 50° C. For example, where the eutectic alloy of X and Y is $Sn_{42}/Bi_{58}$ (melting point 138° C.) a non-eutectic alloy present in the TLPS compositions of the invention will typically have an onset of melting at around 138° C. and a liquidus temperature between about 142° C. and about 188° C.

In the practice of the invention, the at least one high-melting-point metal M, and at least one alloy XY, are selected so that the products of the transient liquid phase sintering reaction will have the optimum combination of attributes for the intended application. Key attributes that may be contemplated for the selection of M encompass characteristics such as thermally stable resistance, ductility, high electrical and thermal conductivity, coefficients of thermal expansion similar to the surrounding materials, and the like.

Advantageously, metallic element Y is present in low-melting-temperature alloy XY in excess of the amount of Y in a eutectic alloy of X and Y, thus providing a greater amount of Y that can react with M to form stable intermetallics. As these YM intermetallics form, the amount of Y in the alloy is depleted, thereby driving the unreacted alloy toward the eutectic proportion.

An excess of Y versus X in the low temperature alloy results in a lower amount of residual carrier X in the final sintered product. Typically, the TLPS compositions of the invention have an excess of Y, or an increased percentage of Y in the low melting temperature alloy as compared to a eutectic mixture or alloy of X and Y. Thus, the invention provides a reduction in the amount of X in the low temperature alloy relative to the eutectic alloy of X an Y. In certain aspects of the invention, the proportion of X in the low-melting temperature alloy is less than 68%, less than 65%, less than 60%, less than 55%, less than 50%, or less than 45% by weight of the proportion of X in the eutectic alloy of X and Y.

High Melting Point Metal

The at least one HMP metal, is typically copper, although other metals are contemplated as the application warrants—such as to be resistant to copper etchant solutions, to form resistors, to bond to aluminum, to provide a harder wear surface such as in a connector, and the like. The use of additional HMP metals in combination with copper is also contemplated in order to obtain TLPS reaction products with optimal characteristics. For instance, in some applications the mechanical strength of the processed composition is less important than the electrical conductivity, or the thermal conductivity may be more important than the ductility. As it is often necessary to optimize one property at the expense of another, the individual constituents may be selected to give optimal performance in the intended application according to properties of the elements that are well-known in the art. Silver, gold, palladium, nickel and aluminum are specifically contemplated for use in the compositions and methods of the invention, either alone or in various combinations, including combinations with copper.

Low Melting Point Metal

The reactive, low melting point metal element, Y, can be, for example, Sn, Bi, Zn, Ga, In, Te, Hg, Tl, Sb, Se, Po and combinations thereof. Typically, Y is Sn, Bi, Ga, In or a combination thereof. Most often Y is Sn. In certain embodiments of the invention, the reactive metal Y in the low melting temperature alloy is Sn, and the HMP metal M is Cu or Ag.

Facilitator Metal Elements

The facilitator metal element, X, can be, for example, Bi, In, Pb, Ag, Cu, Sb, Au, Ni or a combination thereof, and frequently is Bi. In certain aspects, the reactive, LMP metal Y is Sn and the facilitator metal X is Bi.

In one embodiment of the invention, all of the reactive metallic element Y is combined with the facilitator, non-reactive metallic element X in a single particle type. In the practice of this embodiment, the single XY particle type is blended with particles of the high melting point metal M to the exclusion of other metallic particles. Thus, in this embodiment, the TLPS composition consists of a first particle types comprising HMP metal M, a second particle consisting of low melting temperature, non-eutectic alloy XY, and an organic vehicle.

In another embodiment of the invention, the second particle type (e.g., XY) is blended with another particulate source of metallic element Y to further enrich the TLPS system with additional reactive metal element Y. In this embodiment, the TLPS composition thus comprises a first particle type comprising HMP M, a second particle type comprising low melting temperature non-eutectic alloy XY, a third particle type comprising Y in elemental form or as an alloy, and an organic vehicle.

Metal Additives

In a further embodiment of the invention, beneficial metal additives A are incorporated into the TLPS metallurgy via blending of additive elemental or alloy powders with the predominant metal and alloy powder constituents described above. Such metal additives can participate in the invention metallurgy, provided that the additive metal powder is either molten at the process temperature or is soluble in the molten phase. Silver, for instance, may offer increased diffusion, as well as mechanical and electrical benefits to a copper-tin-bismuth metallurgy and may readily be incorporated into a TLPS composition of these elements as an elemental powder or as a ternary constituent of the non-eutectic alloy. As another example, both Ni and Ce have been demonstrated to substantially improve the ductility of solder alloys of Sn when incorporated in proportions constituting less than 1 weight percent of the composition. In such embodiments, the TLPS composition may, for example, comprise a first particle type comprising HMP M, a second particle type comprising low melting temperature, non-eutectic alloy XY and a metal additive A, and an organic vehicle, or the TLPS composition may, comprise a first particle type comprising HMP M, a second particle type comprising low melting temperature, non-eutectic alloy XY, a third particle type comprising a metal additive A, and an organic vehicle.

Ternary Alloys

In certain aspects of the invention, the low melting temperature, non-eutectic alloy is a binary alloy optionally blended with additional low melting temperature metals, metal alloys and/or metal additives. In other aspects of the invention, the low melting temperature, non-eutectic alloy is a ternary alloy containing an additional metallic element Z. Metallic element Z can be included in the low melting temperature, non-eutectic alloy, for example, to manipulate the proportions of X and Y, to alter the melting temperature of the non-eutectic alloy or to impart benefits conferred by metal additives described above, all within a single particle type. Z can be either reactive or non-reactive with M at the process temperature; further, Z can be selected to form intermetallics with Y or with both Y and M. In such aspects of the invention, the TLPS composition thus comprises a first particle type comprising HMP M, a second particle type comprising low melting temperature non-eutectic alloy XYZ, and an organic vehicle. For any embodiment of the invention described herein containing a binary low melting temperature, non-eutectic alloy XY, a ternary low melting temperature, non-eutectic alloy XYZ can be substituted for the binary alloy XY. For example, the TLPS composition of the invention can comprise a first particle type comprising HMP M, a second particle type comprising low melting temperature, non-eutectic alloy XYZ, and an organic vehicle; or the TLPS composition can comprise a first particle type comprising HMP M, a second particle type comprising low melting temperature, non-eutectic alloy XY, a third particle type comprising a metal additive A, and an organic vehicle.

Exemplary Non-Eutectic Alloy Systems

Although alloys of tin and bismuth are particularly suitable to TLPS compositions for standard printed circuit board and semiconductor packaging, non-eutectic alloy compositions containing a variety of low melting point metals Y and facilitator metal elements X are contemplated, particularly for use in niche applications with unusual processing or use requirements. Some exemplary non-eutectic alloys contemplated for use in the compositions of the present invention are listed in Table 1 below. For comparison, Table 1 also lists the eutectic alloy of the same elements for each non-eutectic alloy contemplated.

TABLE 1

| | Eutectic | | Non-eutectic | | | |
|---|---|---|---|---|---|---|
| Elements | Alloy | Melting Temp. (° C.) | Alloy (XY or XYZ) | Melting Range (° C.) | Receptive HMP Metal (M) | Application |
| Sn, Bi | $Sn_{42}/Bi_{58}$ | 138 | $Sn_{80}/Bi_{20}$ | 138-205 | Cu | Forming interconnections between circuit layers in printed circuit boards and semiconductor packages. Attaching semiconductor die to substrates. |
| Sn, In | $Sn_{48}/In_{52}$ | 118 | $Sn_{76}/In_{24}$ | 118-197 | Cu or Ag | Attaching components with substantially different CTEs |
| Ag, Bi | $Ag_3/Bi_{97}$ | 270 | $Ag_{50}/Bi_{50}$ | 270-500 | Al | Underbump metallurgy substitute to make solderable die pads |

TABLE 1-continued

| Elements | Eutectic | | Non-eutectic | | Receptive HMP Metal (M) | Application |
|---|---|---|---|---|---|---|
| | Alloy | Melting Temp. (° C.) | Alloy (XY or XYZ) | Melting Range (° C.) | | |
| Ag, In | $Ag_3/In_{97}$ | 143 | $In_{50}/Ag_{50}$ | 143-500 | Ag | Low temperature silver sintering for low resistance electrical conductors |
| Sn, Pb | $Sn_{63}/Pb_{37}$ | 183 | $Sn_{90}/Pb_{10}$ | 183-213 | Cu or Ag | Lead-exempt high-operating-temperature environments |
| Bi, Pb, Sn | $Sn_{18}/Bi_{50}/Pb_{30}$ | 160 | $Sn_{46}/Bi_8/Pb_{46}$ | 160-173 | Cu or Ag | Attaching components to low melting temperature flexible substrates |

Particle Size, Shape and Ratios

High-melting-point metal M, and non-eutectic alloy XY are introduced into the composition as particles (e.g. powders). The particles may be spherical, irregular, flakes, spongiform, rods and other forms known to those of skill in the art. The particles of HMP metal M, may be substantially elemental, may be alloyed with other elements, may be deposited onto a non-metallic or other core particle as a coating, or may itself be coated with another element, inorganic coating or organic coating. Likewise, low-melting-point alloy XY may be a binary alloy consisting exclusively of metallic element X and reactive, LMP metallic element Y, or may be alloyed with other constituents, may be deposited onto a non-metallic or other core particle as a coating, or may itself be coated with another element, inorganic coating or organic coating.

The particles, such as powders, of HMP metal, M, and the non-eutectic, low-melting-temperature alloy XY typically have a nominal diameter between about 0.1 µm up to 100 µm. Typically, the particles are about 1 µm up to about 50 µm, and most often are about 1 µm to 20 µm. The first and second particles can be about the same size and shape or can be differently sized and/or shaped. In some embodiments, either or both of the first and second particles are substantially uniform in size. In other embodiments, two or more sizes of particles are present in the TLPS compositions, including a variety of particles sizes and particle mixtures that include particles throughout the range of about 1 nm to about 100 µm, about 10 nm to about 100 µm, about 100 nm to about 75 µm, about 10 µm up to about 50 µm, and about 1 µm to about 20 µm. In some instances, strict control of the particle size distribution, generally achieved through hard sieving, can be used to render the TLPS compositions of the invention suitable for deposition techniques such as dispensing, ink jetting and the like.

Generally, the HMP metal M and low melting temperature, non-eutectic alloy XY, are provided in the formulation in the weight proportion of about 1:10 to about 10:1. In certain compositions according to the invention, the proportion is about 1:5 to about 5:1. In other formulations, the proportion is about 1:3 to about 3:1, or about 1:2 to about 2:1. In certain aspects, the proportion of M to XY is about 1:1.5 to about 1.5:1 or about 1:1.

The constituents of exemplary TLPS compositions according to embodiments of the invention are given below in Table 2.

TABLE 2

| Composition | HMP Metal (M) | Non-Eutectic Alloy | Organic Vehicle | Total (wt %) |
|---|---|---|---|---|
| 1 | Cu flake or powder, 20-80 wt % | $Sn_{80}/Bi_{20}$ powder, 20-80 wt % | 1-30 wt % | 100 |
| 2 | Cu flake or powder, 20-80 wt % | $Sn_{76}/In_{24}$ powder, 20-80 wt % | 1-30 wt % | 100 |
| 3 | Ag flake or powder, 20-80 wt % | $Sn_{76}/In_{24}$ powder, 20-80 wt % | 1-30 wt % | 100 |
| 4 | Al flake or powder, 20-80 wt % | $Ag_{50}/Bi_{50}$ powder, 20-80 wt % | 1-30 wt % | 100 |
| 5 | Ag flake or powder, 20-80 wt % | $In_{50}/Ag_{50}$ powder, 20-80 wt % | 1-30 wt % | 100 |
| 6 | Cu flake or powder, 20-80 wt % | $Sn_{90}/Pb_{10}$ powder, 20-80 wt % | 1-30 wt % | 100 |
| 7 | Al flake or powder, 20-80 wt % | $Sn_{90}/Pb_{10}$ powder, 20-80 wt % | 1-30 wt % | 100 |
| 8 | Cu flake or powder, 20-80 wt % | $Sn_{46}/Bi_8/Pb_{46}$ powder, 20-80 wt % | 1-30 wt % | 100 |
| 9 | Ag flake or powder, 20-80 wt % | $Sn_{46}/Bi_8/Pb_{46}$ powder, 20-80 wt % | 1-30 wt % | 100 |

Thus, the present invention also provides methods for preparing the TLPS compositions described herein by providing at least one high-melting-point metal M in particulate form, at least one low-melting-temperature alloy in particulate form, and an organic vehicle; and combining the particles and organic vehicle in the following proportions, based on the total weight of the composition:

i) between about 20 wt. % and about 80 wt. % of M;

ii) between about 20 wt. % and about 80 wt. % of the low-melting-temperature alloy; and iii) between about 1% and about 30 wt. % of the organic vehicle.

Many of the non-eutectic alloys contemplated for the TLPS compositions of the invention are commercially available. However, it may be necessary to prepare a custom alloy to obtain the optimal non-eutectic alloy composition for a given application. Non-eutectic alloys that are not commercially available can be prepared by methods known in the art. For example, metallic element X and metallic element Y can be mixed together in the desired non-eutectic proportion in a molten state to form the non-eutectic alloy, and the resulting alloy can then be atomized to produce a particulate form.

Particle Coatings

Coatings may be present on either or both of the first and second particles, comprising M and XY, respectively. Coatings contemplated for use include metals, inorganic coatings, organic coatings and organo-metallic coatings. Preparing the particles with a coating can be used, for example, to introduce an additional metallic element into the TLPS compositions of the invention in order to alter the properties of the processed metallic matrix, protect the particles from oxidation, prevent the metals or metal oxides from premature reaction with the organic constituents, facilitate dispersion of the particles in the matrix, maintain the particles in suspension, impart lubricity to the composition, prevent agglomeration of the particles, and the like. The particular selection of the presence and type of coating is dependent on the application contemplated for the TLPS composition, the method of deposition and the chemistry of the organic vehicle—all of which are within the knowledge of the skilled artisan. Metals (such as tin and silver), phosphorous containing moieties such as self-assembling phosphonate monolayers, saturated and unsaturated fatty acids, inorganic and organic metal salts, metal alkoxides, triazoles, and polyaniline are all specifically contemplated as components of useful coatings according to the present invention.

Organic Vehicles

The organic vehicle for the TLPS composition may simply be a carrier for the metallic particles, serving to hold the mixture together for easy of application and to keep the various particles in close proximity to each other. More typically, the organic vehicle provides a flux activity, particularly when a HMP metal is a non-noble metal, and may provide a mechanism for self-inerting the flux during applications in which there is no opportunity for the flux to be driven off during processing. The organic vehicle may further include thermoplastic materials that allow the TLPS composition to be shaped as desired prior to processing, and may contain polymer precursors and/or other compounds and solvents that react to form an interpenetrating matrix with the metallic network during processing.

The organic vehicle of the invention composition serves to make the metallic reagents available for reaction and to protect them from the environment, much as a solvent does in an organic reaction. Several factors determine the selection of an appropriate solvent for an organic reaction (e.g. polarity, protic or aprotic, miscibility with water, etc.). Likewise, the organic vehicle in the compositions of the present invention is selected for appropriate attributes. The most critical attribute of the organic vehicle is that it must remove the metallic oxides from the surfaces of the metallic reagents to make the reagents available for reaction. Removal of the metallic oxides is referred to as "fluxing" and may be accomplished by a variety of chemical species known to those of skill in the art, including organic acids and strong bases. Other attributes of the organic vehicle are selected on an application-specific basis. For instance, in an application in which invention metallic compositions are employed as a solder paste replacement, the entire organic vehicle may be formulated to volatilize during processing. In applications in which invention metallic compositions are employed in adherent coatings on nonmetallic surfaces, the organic vehicle may be selected for adhesive properties. Therefore, aside from the necessity for a fluxing component, the organic vehicle may include a wide variety of organic constituents that are well known in the art.

The constituents of the organic vehicle may be selected by those having ordinary skill in the art in accordance with the requirements of the application to meet specific deposition, processing, adhesion or other performance characteristics. In some embodiments, the organic vehicle may be comprised of a combination of a flux and a resin. Those skilled in the art can select both the flux and the resin from the products commonly used for these purposes. As a non-limiting example, an epoxy material may be used as a resin.

The organic vehicle will generally comprise about 1 to 30 weight percent (wt. %), typically, about 5-25 wt %; often about 10-20 wt. %, and most frequently, about 10 wt. % of the TLPS composition.

Applications of Inventive TLPS Compositions

The metallurgical networks formed from the TLPS compositions of the invention are useful for electrically, thermally and/or mechanically connecting elements within electrical structures. Exemplary applications in which inventive compositions may be used include connecting semiconductor dies to packaging elements; connecting packaged semiconductor components to printed circuit boards; connecting other discrete components to electronic substrates; forming connections between stacked die; forming circuit traces; filling holes in electronic substrates; interconnecting circuit layers in printed circuit boards and/or semiconductor packages; forming collection grids for solar panels; forming electrically conductive pillars, cylinders or columns; to electrically interconnecting electrical subsystems through interposer structures, and the like.

The TLPS compositions of the invention can be applied using various techniques, including, but not limited to, needle dispensing, stenciling, screen printing, ink jetting, extrusion, casting, spraying and other methods that would be known to those of skill in the art. Once applied, the compositions of the invention are thermally processed in an oven, on a hot plate, in a lamination press, or by any other available means. The skilled artisan will be aware of additional methods that are typically employed for the processing of solder or filled organic adhesives that will be suitable for processing the TLPS compositions described herein. The specific thermal process conditions are dependent upon the application, the TLPS composition and any organic binder constituents.

Thus the present invention also provides methods for forming mechanical connections, conduction connections, conductive circuits and the like, in an electrical assembly, including the steps of applying any TLPS composition described herein to at least one element in the electronic assembly, and heating the element to the process temperature, $T_1$, at which the high melting point metal M forms intermetallic species with the reactive, low melting point metal Y at temperature $T_1$, thereby forming a conductive connection or circuit in the electrical assembly. The element in the electronic assembly can be any of those listed above. The TLPS composition can be applied by any available method, such as needle dispensing, stenciling, screen printing, ink jetting, extrusion, casting, spraying, and the like.

EXAMPLES

Example 1

TLPS formulations were prepared for the purpose of attaching semiconductor die electrically, thermally and mechanically to lead frames. The composition of the alloy was varied to determine the effect on the mechanical strength of the joint. The specific proportions of constituents in the TLPS formulations were as indicated in the Table 3 below:

TABLE 3

| Component | DT0005-50 0627121 | DT0005-51 0627122 | Control DAP214 2-0606122#3 |
|---|---|---|---|
| Organic Vehicle | | | |
| Oleic acid/triethanolamine salt (1:1 molar) | 0.732 | 0.732 | 0.732 |
| Antifoam 1400[1] | 0.146 | 0.146 | 0.146 |
| Cationic Catalyst[2] | 0.073 | 0.073 | 0.073 |
| Phenol/Alkanolamine Salt Flux[3] | 2.195 | 2.195 | 2.195 |
| Mixture of epoxy & epoxy-acrylate resins[4] | 0.781 | 0.781 | 0.781 |
| Epoxy-Acrylate Diluent[5] | 2.146 | 2.146 | 2.146 |
| Diacrylate Resin[6] | 2.927 | 2.927 | 2.927 |
| Metallic Components | | | |
| 3 μm Mitsui copper | 12 | 12 | 12 |
| 8 micron copper, powder | 24 | 24 | 24 |
| 8 μm copper flake | 15 | 15 | 15 |
| $Sn_{42}/Bi_{58}$, 10 μm | 40 | | |
| Sn—Bi(60/40), 10 μm | | 40 | |
| Sn—Bi(80/20), 10 μm | | | 40 |
| Total | 100 | 100 | 100 |

[1]Dow Corning ®;
[2]PC-2506 (Diaryliodonium-SbF6, Solid Salt), Polyset Corp.
[3]Ortho-Diallyl Bisphenol A:triethanolamine salt (1:2 molar ratio);
[4]Huntsman Tactix 756 ®:4-Hydroxybutyl Acetate Glycidyl Ether (5.5:2 w/w);
[5]4-hydroxybutyl acrylate glycidyl ether;
[6]Sartomer SR833S (acrylate ester tricyclodecane dimethanol diacrylate), Sartomer Company, Inc., Exton, Pennsylvania.

The formulations listed in Table 3 were prepared for attaching a 3 mm×3 mm gold back semiconductor die to a silver-plated copper leadframe. The formulation was deposited as a 35 micron coating on the lead frame using by stencil printing. The die was placed on top of the coating and the assembly was processed by ramping from 25° C. to 205° C. over 45 minutes, followed by an isothermal hold at 205° C. for 90 minutes in $N_2$. A shearing tool was used to displace the die on a portion of the samples. The force required to remove the die was recorded for each sample as an indication of adhesion.

As can be seen in the die shear results in Table 4, the higher the proportion of tin above the eutectic, the higher the resulting strength of the joint between the die and lead-frame. This higher strength is believed to be indicative of more thorough sintering between the copper and tin in the TLPS composition.

TABLE 4

| DT0005-50 0627121 | | DT0005-51 0627122 | | Control | |
|---|---|---|---|---|---|
| Part # | Adhesion (kg) | Part # | Adhesion (kg) | Part # | Adhesion (kg) |
| 1 | 3.7 | 1 | 8.4 | 1 | 7.6 |
| 2 | 3.1 | 2 | 8.1 | 2 | 11.46 |
| 3 | 3.7 | 3 | 6.3 | 3 | 10.2 |
| 4 | 3.2 | 4 | 5.2 | 4 | 11.3 |
| 5 | 5.1 | 5 | 9.8 | 5 | 9 |
| 6 | 4.1 | 6 | 10.9 | 6 | 8.9 |
| 7 | 3.9 | 7 | 6 | 7 | 11.6 |
| 8 | 5.5 | 8 | 9.1 | 8 | 8.9 |
| | | | | 9 | 7.9 |
| Av. | 4.04 | Av. | 5.50 | Av. | 9.65 |
| S.D. | 0.85 | S.D. | 1.99 | S.D. | 1.54 |
| Min. | 3.10 | Min. | 5.20 | Min. | 7.60 |

Example 2

Figure 3:
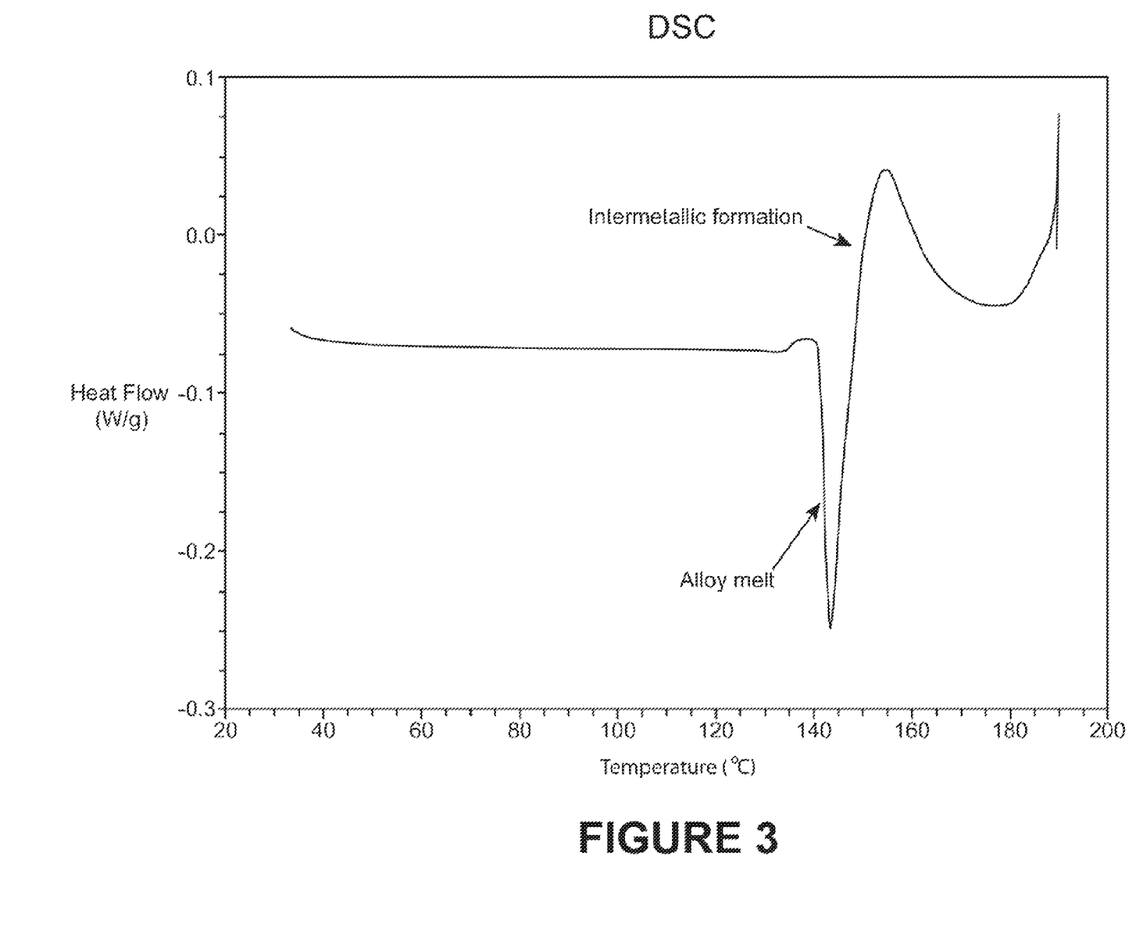
FIG. 3 shows a DSC scan of a TLPS composition comprising a eutectic tin-bismuth alloy blended with copper and a common tin-silver-copper alloy. The onset of the eutectic melt can be observed followed by the exothermic reaction between the tin and copper to form intermetallics—the sintering reaction.

Two TLPS pastes were formulated for use in microvia holes for the interconnection of layers of circuitry in a multilayer printed circuit board. In each paste, the HMP metal, Cu, was 40% by weight, the organic vehicle (described above in EXAMPLE 1) was 10% by weight and the alloy constituted the remaining 50%. In the first paste, the low melting temperature alloy used was a blend of two eutectic alloy powders: $Sn_{58}/Bi_{42}$ and $Sn_{96.5}/Ag_3/Cu_{0.5}$ in a proportion such that the total ratio of Sn to Bi was 4:1. In the second paste, the low melting temperature alloy used was a single non-eutectic alloy powder containing 80 weight percent Sn and 20 weight percent Bi (Sn to Bi=4:1). The melting points for the two eutectic alloys are 138° C. and 217° C., respectively. A dime sized sample of each of these pastes was processed in a lamination press under the same conditions that would be used to process the multilayer printed circuit boards. The lamination press was set at 183° C. and the melting temperature range for $Sn_{80}/Bi_{20}$ is 138-205° C. The two samples of processed TLPS pastes were then analyzed by differential scanning calorimetry (DSC) to determine the relative completeness of reaction. The temperature in the DSC instrument was raised to 260° C. to simulate a solder reflow cycle, cooled back to room temperature and then raised again to 400° C. The extent of the difference in melting behavior between the first and second heating cycles is indicative of the completeness of the reaction during the lamination process. The results are shown in FIGS. 3 and 4, and summarized below in Table 5.

TABLE 5

| Sample | Peak Melt Temp Heat 1 (° C.) | Peak Size Heat 1 (J/g) | Peak Melt Temp Heat 2 (° C.) | Peak Size Heat 2 (J/g) | Change In Melt Temp (° C.) | Change In Peak Size (J/g) |
|---|---|---|---|---|---|---|
| 1 | 208 | 9.86 | 200 | 9.01 | 8 | 0.85 |
| 2 | 204 | 9.08 | 200 | 8.94 | 4 | 0.14 |

Sample 2 is clearly more fully reacted after the lamination cycle than Sample 1. This is important to ensure the electrical properties of the multilayer circuit board do not change with subsequent heat exposures such as component assembly.

Example 3

Two TLPS paste formulations were prepared with 40% by weight copper powder, 10% by weight of organic fluxing binder (i.e., organic vehicle; see EXAMPLE 1), and 50% by weight of an alloy powder. In the first paste, the alloy powder was eutectic $Sn_{42}/Bi_{58}$. In the second paste, the alloy powder was a non-eutectic $Sn_{80}/Bi_{20}$. The two pastes were bladed onto glass slides using 50 micron thick polyimide tape as a guide and a razor blade as the screed. Both slides were dried in an oven at 95° C. for 30 minutes to evolve the solvent in the binder and then the slides were processed in a vapor phase reflow unit at 220° C. for 2 minutes. The tape was removed from the slides leaving ½ inch wide strips. Calipers were used to define a 2 inch length and the resistance of the delineated area was measured by a 4-point digital ohmmeter. The resistance for sample 1 was 0.97 ohm and the resistance for sample 2 was 0.07 ohm. The reduction in Bi as a proportion of the alloy clearly confers a substantial improvement in the electrical properties of the TLPS paste.

Example 4

Two conductive films were prepared from TLPS varnish compositions. The compositions were prepared with 45% by weight copper powder, 10% by weight organic binder including a flux, thermosetting resin and a thermoplastic resin (i.e., organic vehicle; see EXAMPLE 1); and 45% by weight alloy powder. The pastes thus formed were diluted with solvent to achieve a varnish consistency and coated onto a carrier film. The solvent was then evaporated at elevated temperature to make a dry film. In film Sample 1 the alloy powder was a mixture of 75% $Sn_{42}/Bi_{58}$ and 25% $Sn_{96.5}/Ag_3/Cu_{0.5}$. In film Sample 2, the alloy powder was a single non-eutectic type $Sn_{80}/Bi_{20}$. Strips of each conductive film were cut and small sections of film were disposed between metallized die and lead frames. The strips and constructions with the die were processed in a nitrogen environment at 205° C. The electrical resistance of the strips was then measured and the die constructions were sheared at 260° C. to determine die shear strength. The results were as indicated below in Table 6.

TABLE 6

| Sample | Average resistivity of strip (μohms * cm) | Average die shear strength (kg/mm$^2$) |
|---|---|---|
| 1 | 173 | 0.32 |
| 2 | 97 | 0.67 |

In the TLPS conductive films, the thermoplastic resin is believed to physically impede the reaction between the alloy and the high-melting-point metal. Use of the non-eutectic alloy provided a shorter diffusion distance between individual copper and alloy particles and substantially improved the extent of the TLPS reaction. This is evidenced by the marked improvement in both electrical resistivity and die shear strength.

Example 5

TLPS paste formulations are prepared as described above in EXAMPLE 3, with 40% by weight copper powder, 10% by weight of organic fluxing binder (see Example 1, supra), and 50% by weight of the non-eutectic alloy powder indicated in Table 7.

The pastes are bladed onto glass slides using 50 micron thick polyimide tape as a guide and a razor blade as the screed. The slides are dried in an oven at 95° C. for 30 minutes to evolve the solvent in the binder and then the slides are processed in a vapor phase reflow unit at 220° C. for 2 minutes. The tape is removed from the slides leaving ½ inch wide strips. Calipers are used to define a 2 inch length and the resistance of the delineated area is measured by a 4-point digital ohmmeter. The resistance for each sample is indicated in Table 7. The reduction in Bi as a proportion of the alloy confers a substantial improvement in the electrical properties of the TLPS paste.

TABLE 7

| Sample # | Alloy | HMP Metal (M) | Resistivity (μohm * cm) |
|---|---|---|---|
| 1 | $Sn_{48}/Bi_{52}$ | Cu | 57 |
| 2 | $Sn_{60}/Bi_{40}$ | Cu | 46 |
| 3 | $Sn_{65}/Bi_{35}$ | Cu | 42 |
| 4 | $Sn_{70}/Bi_{30}$ | Cu | 38 |
| 5 | $Sn_{75}/Bi_{25}$ | Cu | 33 |
| 6 | $Sn_{80}/Bi_{20}$ | Cu | 29 |
| 4E | $Sn_{48}/Bi_{52}$ | Cu | 24 |
| 4N | $Sn_{48}/Bi_{52}$ | Cu | 20 |
| 5E | $Sn_{48}/Bi_{52}$ | Ag | 57 |
| 5N | $Sn_{80}/Bi_{20}$ | Ag | 28 |
| 6E | $Sn_{63}/Pb_{37}$ | Ag | 15 |
| 6N | $Sn_{90}/Pb_{10}$ | Ag | 12 |
| 7E | $Sn_{18}/Bi_{50}/Pb_{30}$ | Cu | 57 |
| 7N | $Sn_{46}/Bi_{8}/Pb_{46}$ | Cu | 23 |
| 8E | $Sn_{18}/Bi_{50}/Pb_{30}$ | Ag | 57 |
| 8N | $Sn_{46}/Bi_{8}/Pb_{46}$ | Ag | 22 |

Example 6

TLPS paste formulations are prepared as described above in EXAMPLE 3, with 40% by weight high melting point metal M (copper, silver or aluminum), 10% by weight of organic fluxing binder (i.e., organic vehicle; see Example 1, supra), and 50% by weight of the non-eutectic alloy powder indicated in Table 8.

The pastes are bladed onto glass slides using 50 micron thick polyimide tape as a guide and a razor blade as the screed. The slides are dried in an oven at 95° C. for 30 minutes to evolve the solvent in the binder and then the slides are processed in a vapor phase reflow unit at 220° C. for 2 minutes. The tape is removed from the slides leaving ½ inch wide strips. Calipers are used to define a 2 inch length and the resistance of the delineated area is measured by a 4-point digital ohmmeter. The resistance for each sample is indicated in Table 8. The reduction in facilitator metal X as a proportion of the alloy confers a substantial improvement in the electrical properties of the TLPS paste or reduces the cost of the composition (e.g., by replacing In with Sn).

TABLE 8

| Sample # | Alloy | LMP Metal (Y) | Facilitator Metal (X) | HMP Metal (M) | Resistivity (μohm * cm) |
|---|---|---|---|---|---|
| 1E | $Sn_{48}/In_{52}$ | Sn | In | Cu | 10 |
| 1N | $Sn_{76}/In_{24}$ | Sn | In | Cu | 11 |
| 2E | $Sn_{48}/In_{52}$ | Sn | In | Ag | 10 |
| 2N | $Sn_{76}/In_{24}$ | Sn | In | Ag | 11 |
| 3E | $Ag_3/Bi_{97}$ | Ag | Bi | Al | 96 |
| 3N | $Ag_{50}/Bi_{50}$ | Ag | Bi | Al | 51 |
| 4E | $Ag_3/In_{97}$ | Ag | In | Ag | 9 |
| 4N | $Ag_{50}/In_{50}$ | Ag | In | Ag | 5 |
| 5E | $Sn_{63}/Pb_{37}$ | Sn | Pb | Cu | 15 |
| 5N | $Sn_{90}/Pb_{10}$ | Sn | Pb | Cu | 12 |
| 6E | $Sn_{63}/Pb_{37}$ | Sn | Pb | Ag | 15 |
| 6N | $Sn_{90}/Pb_{10}$ | Sn | Pb | Ag | 12 |
| 7E | $Sn_{18}/Bi_{50}/Pb_{30}$ | Sn | Bi | Cu | 58 |
| 7N | $Sn_{46}/Bi_{8}/Pb_{46}$ | Sn | Bi | Cu | 23 |

TABLE 8-continued

| Sample # | Alloy | LMP Metal (Y) | Facilitator Metal (X) | HMP Metal (M) | Resistivity (µohm * cm) |
|---|---|---|---|---|---|
| 8E | $Sn_{18}/Bi_{50}/Pb_{30}$ | Sn | Bi | Ag | 57 |
| 8N | $Sn_{46}/Bi_8/Pb_{46}$ | Sn | Bi | Ag | 22 |

The foregoing, non-limiting examples are intended to be illustrative of the invention only. The inventor contemplates that the various embodiments of the invention may be combined or employed independently on a wide variety of TLPS metallurgical compositions.

What is claimed is:

1. A transient liquid phase sintering (TLPS) composition comprising:
   a) at least one first particle comprising at least one high-melting-point metal (M); and
   b) at least one second particle comprising a low-melting-temperature alloy, wherein the low melting temperature alloy comprises:
      i) a first metallic element (X) that is non-reactive with M;
      ii) a second metallic element (Y) that is reactive with M, wherein X and Y are present in a non-eutectic proportion in the low-melting-temperature alloy, and
      wherein the proportion of X in the low-melting temperature alloy is less than 68% by weight of the proportion of X in a eutectic alloy of X and Y; and
   c) an organic vehicle.

2. The TLPS composition of claim 1, wherein the composition consists of only one type of first particle.

3. The TLPS composition of claim 2, wherein the first particle consists of only one type high-melting point metal.

4. The TLPS composition of claim 1, wherein the composition consists of only one type of second particle.

5. The TLPS composition of claim 4, wherein the second particle consists of only one type of low-melting-temperature alloy.

6. The TLPS composition of claim 1, wherein the proportion of X in the low-melting temperature alloy is less than 65% by weight of the proportion of X in the eutectic alloy of X and Y.

7. The TLPS composition of claim 6, wherein the proportion of X in the low-melting temperature alloy is less than 55% by weight of the proportion of X in the eutectic alloy of X and Y.

8. The TLPS composition of claim 6, wherein the proportion of X in the low-melting temperature alloy is less than 45% by weight of the proportion of X in the eutectic alloy of X and Y.

9. The TLPS composition of claim 6, with the further proviso that the composition does not contain the eutectic alloy of X and Y.

10. The TLPS composition of claim 1, wherein the low-melting-temperature alloy has a liquidus temperature at least 5° C. higher than the melting temperature of a eutectic alloy of X and Y.

11. The TLPS composition of claim 10, wherein the liquidus temperature is less than 50° C. above the melting temperature of the eutectic alloy of X and Y.

12. The TLPS composition of claim 1, wherein the onset of melting of the low-melting-temperature alloy is equal to the melting temperature of the eutectic alloy of X and Y.

13. The TLPS composition of claim 1, wherein M is selected from the group consisting of copper, silver, gold, palladium, nickel, aluminum and combinations thereof.

14. The TLPS composition of claim 13, wherein M is copper.

15. The TLPS composition of claim 1, wherein Y is selected from the group consisting of tin, bismuth, zinc, gallium, indium, tellurium, mercury, thallium, antimony, selenium, polonium and combinations thereof.

16. The TLPS composition of claim 15, wherein Y is tin.

17. The TLPS composition of claim 1, wherein X is selected from the group consisting of bismuth, indium, lead, silver, copper, antimony, gold, nickel and combinations thereof.

18. The TLPS composition of claim 17, wherein X is bismuth.

19. The TLPS composition of claim 1, wherein the low-melting-temperature alloy is a binary alloy consisting of only X and Y.

20. The TLPS composition of claim 1, wherein the low-melting-temperature alloy is a ternary alloy, further comprising a third metallic element (Z).

21. The TLPS composition of claim 20, wherein Z is selected from the group consisting of Pb, Cu, Ag, Sb, In, Bi, Zn, Ga, Ni and combinations thereof.

22. The TLPS composition of claim 21, wherein Z is selected from the group consisting of Cu, Ni, Ag or Pb.

23. The TLPS composition of claim 20, wherein the eutectic alloy is $Bi_{52}/Pb_{30}/Sn_{18}$.

24. The TLPS composition of claim 1, wherein eutectic alloy of X and Y is a binary alloy selected from the group consisting of $Sn_{42}/Bi_{58}$, $In_{52}/Sn_{48}$, $Bi_{97}/Ag_3$, $In_{97}/Ag_3$, and $Sn_{63}/Pb_{37}$.

25. The TLPS composition of claim 1, wherein M is selected from the group consisting of copper, silver and aluminum, and the low melting temperature alloy is selected from the group consisting of $Sn_{(68-90)}/Bi_{(10-32)}$, $Sn_{(80-95)}/Pb_{(5-20)}$, $Sn_{(62-90)}/In_{(10-38)}$, $Bi_{(30-65)}/Ag_{(35-70)}$, and $In_{(30-65)}/Ag_{(35-70)}$ and $Bi_{52}/Pb_{30}/Sn_{18}$.

26. The TLPS composition of claim 1, wherein M is copper and the low melting temperature alloy is $Sn_{(70-90)}/Bi_{(10-30)}$.

27. The TLPS composition of claim 1, wherein at least one first particle comprises a coating.

28. The TLPS composition of claim 27, wherein the coating is selected from the group consisting of a saturated fatty acid, an unsaturated fatty acid, a metal, a metal alloy, an inorganic metal salt, an organic metal salt, a metal alkoxide, and a triazole.

29. The TLPS composition of claim 27, wherein the coating is a phosphonate.

30. The TLPS composition of claim 28, wherein the coating is a saturated fatty acid.

31. A method for preparing the TLPS composition of claim 1 comprising:
   a) providing the least one high-melting-point metal M in particulate form, the at least one low-melting-temperature alloy in particulate form, and the organic vehicle; and
   b) combining the particles and organic vehicle in the following proportions, based on the total weight of the composition;

i) between about 20 weight % and about 70 weight % of the least one high-melting-point metal M in particulate form;
ii) between about 20 weight % and about 70 weight % of the least the at least one low-melting-temperature alloy in particulate form;
iii) between about 1 weight % and about 30 weight % of the organic vehicle, thereby preparing the TLPS composition of claim 1.

32. The method of claim 31, wherein providing the at least one low-melting-temperature alloy in particulate form comprises:
a) mixing the first metallic element X in a molten state with the non-eutectic proportion of the second metallic element Y in a molten state to form an alloy; and
b) atomizing the alloy produced in step b) to form particles.

33. A method for forming a mechanical connection, a conductive connection or a conductive circuit in an electrical assembly comprising:
a) applying the TLPS composition of claim 1 to at least one element of the electronic assembly; and
b) heating the element to a process temperature, $T_1$, wherein the high melting point metal M forms intermetallic species with the reactive, low melting point metal Y at temperature $T_1$,
thereby forming a mechanical connection, a conductive connection or conductive circuit in the electrical assembly.

34. The method of claim 33, wherein the element is selected from the group consisting of a semiconductor die, a packaging element, a packaged semiconductor component, a printed circuit board, an electronic substrate, a stacked die, a circuit trace, a circuit layer, a collection grid, a solar panel, an electrically conductive pillar, an electrically conductive cylinder, an electrically conductive column, and an electrical subsystem.

35. The method of claim 33, wherein applying the TLPS composition comprises at least one technique selected from the group consisting of needle dispensing, stenciling, screen printing, ink jetting, extrusion, casting, and spraying.

* * * * *